(12) United States Patent
Lee

(10) Patent No.: US 6,325,742 B1
(45) Date of Patent: Dec. 4, 2001

(54) SHIFT CONTROL SYSTEM AND METHOD FOR AUTOMATIC TRANSMISSION WHEN SHIFTING INTO DRIVE AFTER REVERSE

(75) Inventor: Hee-Young Lee, Kyunggi-Do (KR)

(73) Assignee: Hyundai Motor Co. Ltd., Seoul (KR)

( * ) Notice: Subject to any disclaimer, the term of this patent is extended or adjusted under 35 U.S.C. 154(b) by 0 days.

(21) Appl. No.: 09/115,754

(22) Filed: Jul. 15, 1998

(51) Int. Cl.[7] ............................................. F16H 61/26
(52) U.S. Cl. ............................ 477/116; 477/117; 477/156
(58) Field of Search ................................. 477/116, 117, 477/156

(56) References Cited

U.S. PATENT DOCUMENTS

| | | | | |
|---|---|---|---|---|
| 4,768,636 | * | 9/1988 | Ito et al. ............................... | 477/116 |
| 5,121,656 | * | 6/1992 | Baba ................... | 477/116 X |
| 5,224,398 | * | 7/1993 | Sasaki ............................. | 477/116 X |
| 5,733,220 | * | 3/1998 | Iizuka ................. | 477/117 X |
| 5,807,207 | * | 9/1998 | Hisano et al. .................... | 477/117 X |

FOREIGN PATENT DOCUMENTS 10-78117 * 3/1998 (JP) .

* cited by examiner

*Primary Examiner*—Sherry Estremsky

(57) ABSTRACT

The shift control system for an automatic transmission in a vehicle includes a plurality of sensors and a transmission control unit. The plurality of sensors sense operating conditions of the vehicle. The transmission control unit controls shift control solenoids and a pressure control solenoid in a hydraulic control system for the automatic transmission based on the sensed vehicle operating conditions. The shift control solenoids control operation of friction elements in the automatic transmission, and the pressure control solenoid controls hydraulic pressure supplied to the friction elements. The transmission control unit detects a change in driving mode from a reverse mode to a drive mode based on the sensed vehicle operating conditions, and controls the shift control solenoids such that the automatic transmission shifts into only a first speed stage in the drive mode when the transmission control unit detects the change in the driving mode from the reverse mode to the drive mode.

16 Claims, 5 Drawing Sheets

SHIFT CONTROL SYSTEM AND METHOD FOR AUTOMATIC TRANSMISSION WHEN SHIFTING INTO DRIVE AFTER REVERSE

BACKGROUND OF THE INVENTION

1. Field of the Invention

The present invention relates to a shift control system and method for an automatic transmission in a vehicle; and more particularly, to a shift control system and method for reducing shift shock in an automatic transmission when shifting from reverse to drive.

2. Discussion of Related Art

Automatic transmissions make it possible for unskilled drivers to quickly and easily learn to operate a vehicle. The provision of a torque converter between the engine and the automatic transmission eliminates the need for a driver to learn how to use a clutch pedal for engaging and disengaging the transmission. Furthermore, the control system for the automatic transmission automatically decides when to shift up and down, thus eliminating the need for the driver to learn these skills.

FIG. 1 illustrates a conventional hydraulic control system for an automatic transmission which includes a front clutch 100, rear clutch 110, low reverse brake 120, end clutch 130 and kickdown band brake 140 (i.e., the friction elements). FIG. 1 also illustrates the torque converter TC that is coupled between the engine and the automatic transmission. The conventional hydraulic control system as shown in FIG. 1 includes shift solenoids S1 and S2 which control the flow of hydraulic fluid to the front clutch 100, rear clutch 110, low reverse brake 120, end clutch 130 and kickdown band brake 140 to effect gear change operations. A pressure control solenoid S3 controls the pressure in the hydraulic system, and thus how quickly the various friction elements are engaged and disengaged. A transmission or shift control unit (TCU) controls the operation of the shift solenoids S1 and S2 and the pressure control solenoid S3.

As further shown in FIG. 1, in conjunction with the shift solenoids S1 and S2, the flow of hydraulic fluid to the friction elements is also controlled in accordance with the position of a driving mode select lever 150. An operator uses the driving mode select lever 150 to place the vehicle in park P, reverse R, neutral N and drive D. The driving mode select lever 150 can also be used to select the second speed stage of drive (as the maximum forward speed stage) D2 or the low speed stage of drive.

When driving the vehicle in reverse and at low speeds, shifting the driving mode select lever 150 from reverse to drive does not cause great shift shock. The reason for this is that the rear clutch 110 is applied when moving from reverse to the first speed stage of drive, and that the application of the rear clutch 110 does not cause a significant instantaneous change in vehicle speed.

However, when driving in reverse at high speeds, and a shift is made into drive, instead of shifting into the first speed stage of drive, the control system attempts to shift into the second speed stage of drive due to the high speed at which the vehicle is travelling. Shifting into the second speed stage of drive requires application of the kickdown band brake 140. Application of the kickdown band brake 140 causes a significant instantaneous change in vehicle speed, such that great shift shock occurs.

SUMMARY OF THE INVENTION

It is an object of the present invention to provide a shift control system and method for an automatic transmission which overcomes the problems and disadvantages discussed above with respect to the prior art.

Another object of the present invention is to provide a shift control system and method for an automatic transmission which prevents shift shock when shifting from reverse to drive.

These and other objects are achieved by providing a shift control system for an automatic transmission in a vehicle, comprising a plurality of sensors each sensing a vehicle operating condition; a transmission control unit controlling shift control solenoids and a pressure control solenoid in a hydraulic control system for said automatic transmission based on said sensed vehicle operating conditions, said shift control solenoids controlling operation of friction elements in said automatic transmission, said pressure control solenoid controlling hydraulic pressure supplied to said friction elements; and said transmission control unit detecting a change in driving mode from a reverse mode to a drive mode based on said sensed vehicle operating conditions, and controlling said shift control solenoids such that said automatic transmission shifts into only a first speed stage in said drive mode when said transmission control unit detects said change in said driving mode from said reverse mode to said drive mode.

These and other objects are further achieved by providing a shift control method for an automatic transmission in a vehicle, comprising sensing a plurality of vehicle operating condition; first detecting a change in driving mode from a reverse mode to a drive mode based on said sensed vehicle operating conditions; and controlling shift solenoids and a pressure control solenoid in a hydraulic control system for said automatic transmission based on said sensed vehicle operating conditions, said shift control solenoids controlling operation of friction elements in said automatic transmission, said pressure control solenoid controlling hydraulic pressure supplied to said friction elements, said controlling step controlling said shift control solenoids such that said automatic transmission shifts into only a first speed stage in said drive mode when said first detecting step detects said change in said driving mode from said reverse mode to said drive mode.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 3:
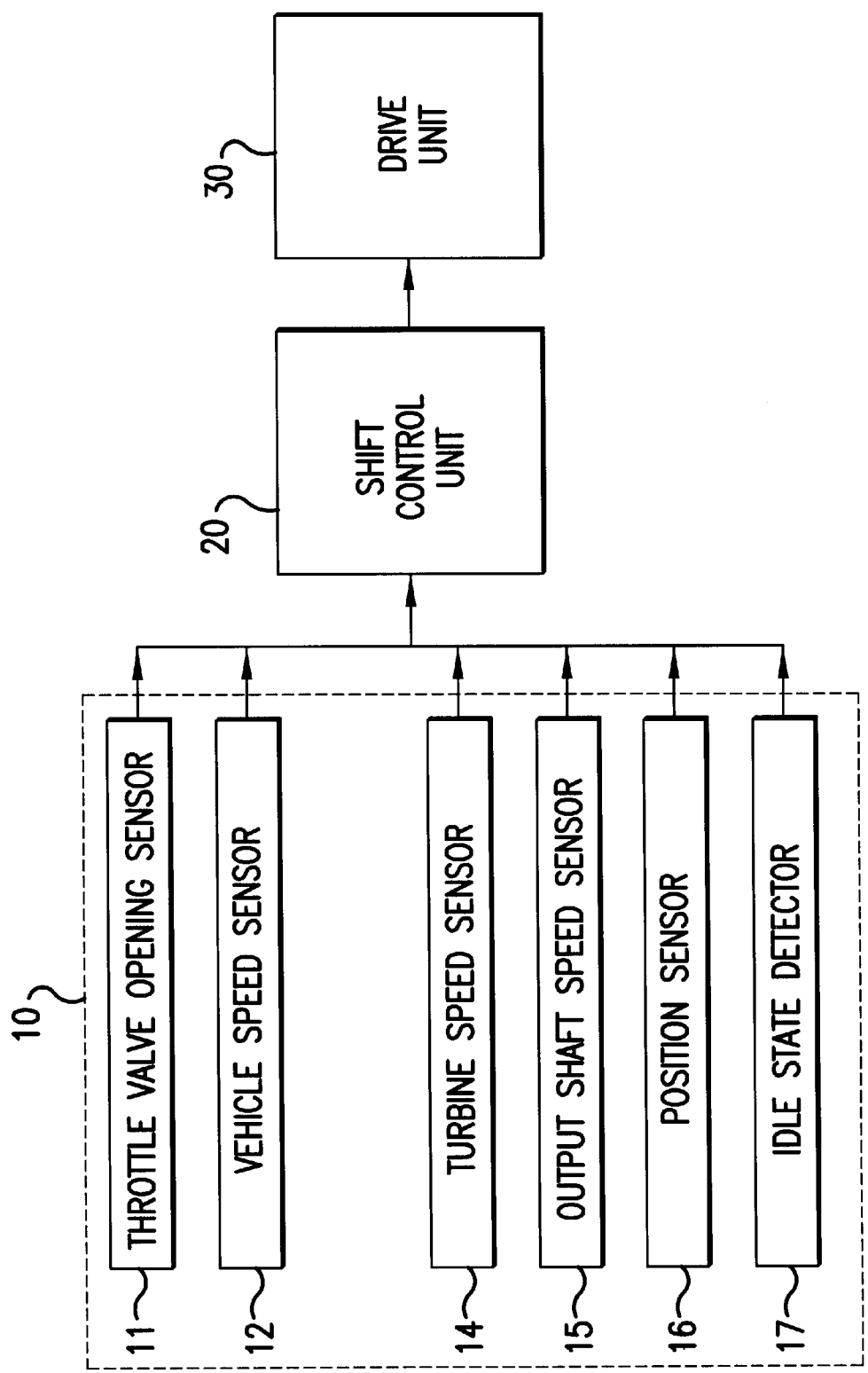
FIG. 3 is a block diagram of the shift control system for an automatic transmission according to the present invention.

FIG. 3 illustrates the shift control system for an automatic transmission according to the present invention. As shown in FIG. 3, a shift or transmission control unit 20 receives the output from a sensor unit 10, and based thereon generates control signals for a driving unit 30. Based on the control signals, the driving unit 30, for example, duty controls the shift solenoids S1 and S2 and the pressure control solenoid S3. Besides implementing a well-known algorithm for controlling the shifting of an automatic transmission, the shift control unit 20 also implements a shift control method according to the present invention for reducing shift shock when a driver shifts from reverse to drive.

The sensors in the sensor unit 10 include a throttle valve opening sensor 11 for measuring the opening degree of a throttle valve, a vehicle speed sensor 12 for measuring the speed of the vehicle; a turbine speed sensor 14 for measuring the turbine speed of the torque converter TC (i.e., the engine speed), an output shaft speed sensor 15 for measuring the speed of the automatic transmission's output shaft, a position sensor 16 for detecting the position, and thus the driving mode, of the driving mode select lever 150, and an idle state detector 17 for detecting when the vehicle is operating in an idle state based on the ON/OFF operating state of an idle switch (not shown).

Figure 4A:
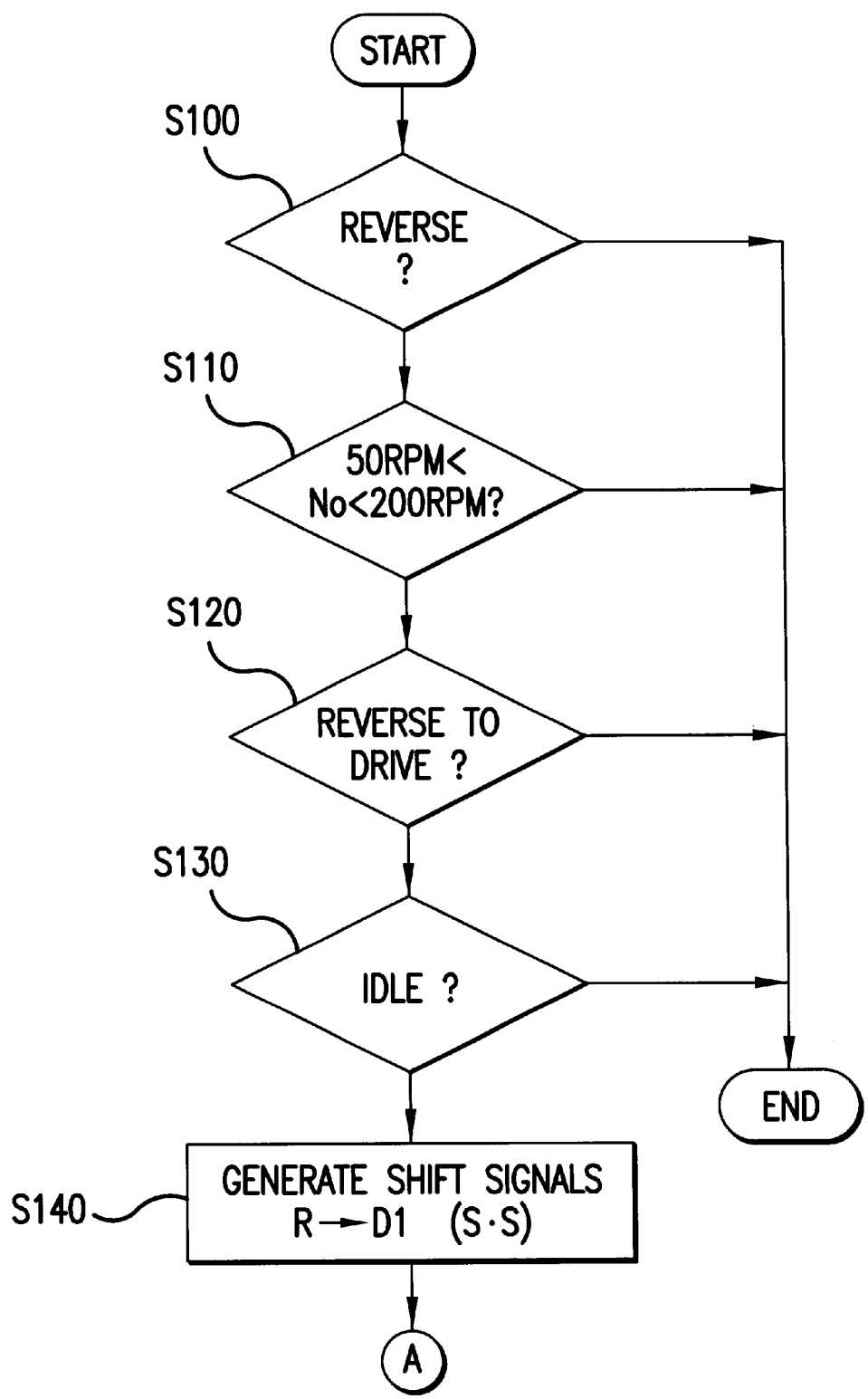
FIGS. 4A–4B illustrate a flow chart of the shift control method for an automatic transmission when shifting from reverse to drive according to the present invention.
Figure 4B:
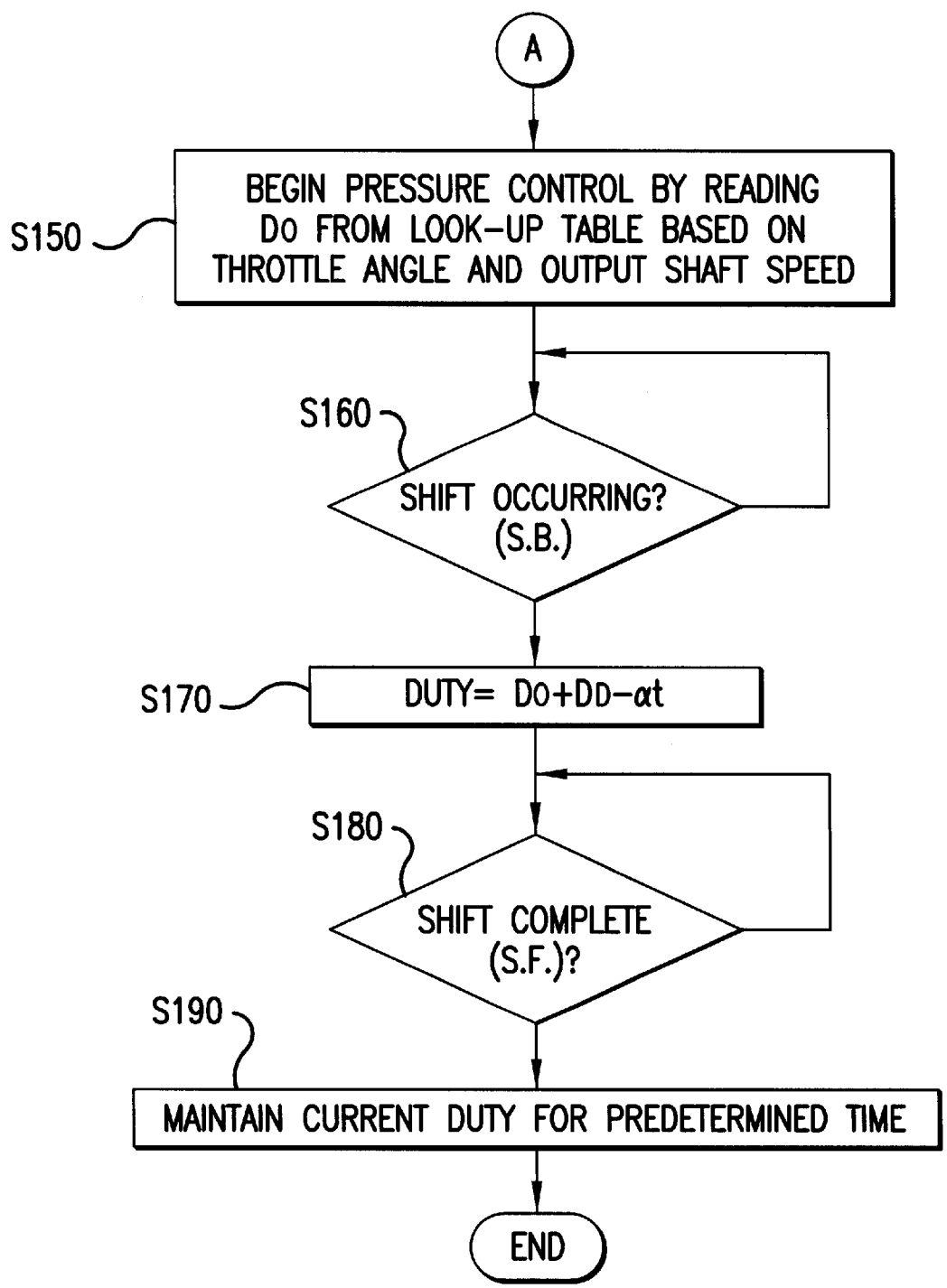

The operation of the shift control system illustrated in FIG. 3 will now be discussed with respect to the flow chart illustrated in FIGS. 4A and 4B. FIGS. 4A and 4B illustrate the shift control method according to the present invention for an automatic transmission when shifting from reverse to drive. As shown in FIG. 4A, in step S100, the shift control unit 20 determines whether the vehicle is operating in reverse based on the output of the position sensor 16. If the vehicle is not being driven in reverse, the method according to the present invention ends; otherwise, in step S110, the shift control unit 20 determines whether the speed of the output shaft No is within a predetermined range.

Specifically, in a preferred embodiment, the shift control unit 20 determines whether or not the speed output from the output shaft speed sensor 15 is greater than 50 RPM but less than 200 RPM. If the speed of the output shaft falls outside this range, then the method according to the present invention ends; otherwise, processing proceeds to step S120. This prevents the transmission from shifting into first gear when the speed of the engine would place too great a load on the transmission.

In step S120, the transmission control unit 20 monitors the output from the position sensor 16 to determine whether or not the driving mode select lever 150 has been moved from reverse to drive. If the driving mode select lever 150 has not moved to drive, then the method according to the present invention ends.

If, however, the driving mode select lever 150 has been moved to drive, then in step S130, the shift control unit 20 determines whether or not the vehicle is operating in an idle state based on the output from the idle state detector 17. If the vehicle is not operating in an idle state, then the method according to the present invention ends.

Figure 1:
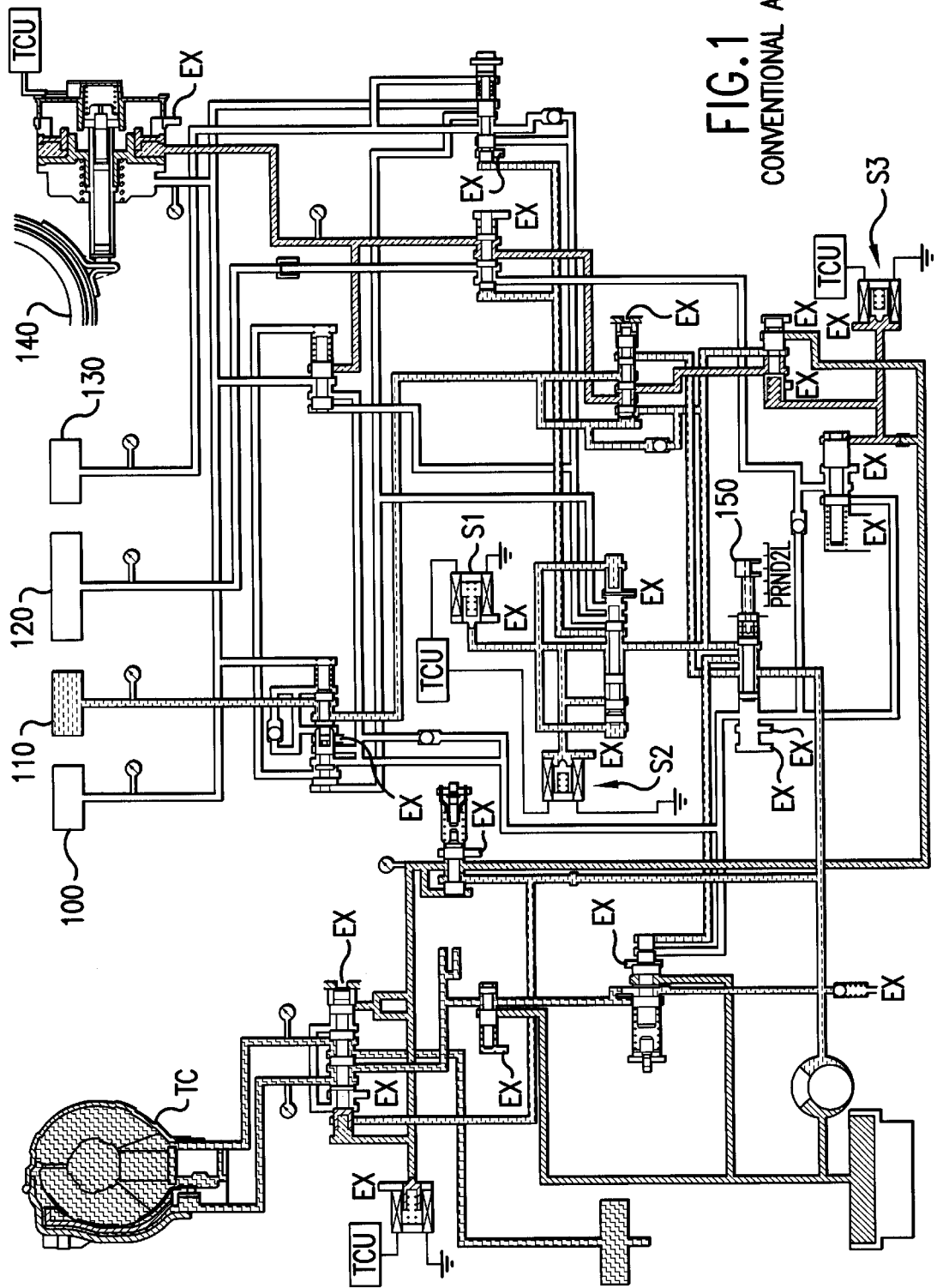
FIG. 1 is a conventional hydraulic control system for an automatic transmission of a vehicle.
Figure 2:
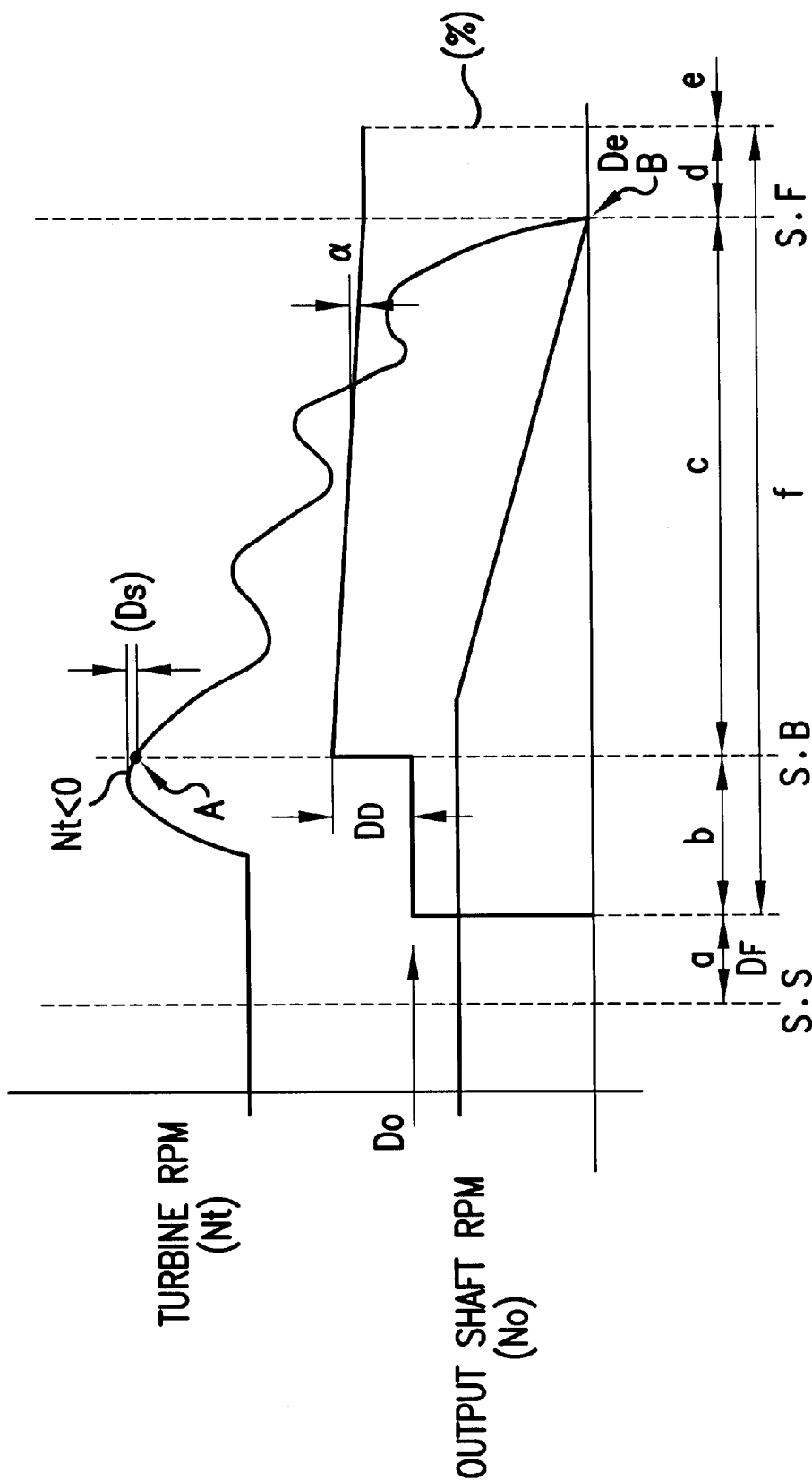
FIG. 2 illustrates the pressure control solenoid duty control pattern generated by the shift control system according to the present invention when shifting from reverse drive.

But, if the vehicle is operating in an idle state, then in step S140, the transmission control unit 20 generates control signals such that the driving unit 30 causes the automatic transmission to shift into the first speed stage of drive (point S.S. in FIG. 2). Accordingly regardless of the automatic transmission control method being employed by the shift control unit 20, when shifting from reverse into drive, the vehicle is placed in the first speed stage of drive to greatly reduce the shift shock.

Next, in step S150, the shift control unit 20 reads an initial duty value or ratio $D_0$ for the pressure control solenoid S3 from an empirically determined look-up table stored therein based on the throttle angle and output shaft speed output from the throttle valve opening sensor 11 and the output shaft speed sensor 15, respectively.

FIG. 2 illustrates the duty value output by the driving unit 30 in response to the control signals from the shift control unit 20. As shown, the shift control unit 20 delays outputting the initial duty value $D_0$ for a first predetermined period of time "a" after the drive unit 30 drives the shift solenoids S1 and S2 to place the automatic transmission in the first speed stage of drive. FIG. 2 also illustrates the change in engine speed Nt and the change in the speed of the output shaft No of the automatic transmission over time.

In step S160, the shift control unit 20 determines whether the shift instructed in step S140 is beginning to occur. Namely, the shift control unit 20 determines whether the change in engine speed Nt is less than zero. Alternatively, this step can be performed by the shift control unit 20 determining whether the absolute value of the change in engine speed is less than 40 rpm.

When the shift control unit 20 determines that the shift is actually occurring (point S.B. in FIG. 2), processing proceeds to step S170. Otherwise, the shift control unit 20 continues to monitor the engine speed output from the turbine speed sensor 14 until it is determined that a shift is occurring.

In step S170, the shift control unit 20 reads an increase duty amount $D_D$ from an empirically determined look-up table stored in the shift control unit 20 using the throttle angle and output shaft speed output by the throttle valve opening sensor 11 and the output shaft speed sensor 15, respectively. The shift control unit 20 then instructs the driving unit 30 to drive the pressure control solenoid S3 at a duty ratio equal to $D_0+D_D-\alpha t$ where $\alpha$ is a predetermined constant and t represents the time from the start of the shift (point S.B. in FIG. 2).

As shown in FIG. 2, controlling the duty ratio in this manner causes the duty ratio of the pressure control solenoid S3 to increase by $D_D$ when the shift begins. As a result, the pressure in the hydraulic control system decreases. As the duty ratio of the pressure control solenoid S3 gradually decreases by $\alpha t$, as shown in FIG. 2, the pressure in the hydraulic control system gradually increases. Accordingly, the rear clutch 110 is slowly applied, reducing shift shock.

During the period of time that this duty ratio of the pressure control solenoid S3 decreases, the shift control unit 20 monitors the engine speed Nt and the output shaft speed No from the turbine speed sensor 14 and the output shaft speed sensor 15, respectively, to determine when the shift is finished. Specifically, the shift control unit 20 determines that the shift is finished (point S.F. in FIG. 2), when the engine speed Nt equals the output shaft speed No. When the shift is completed, processing proceeds from step S180 to step S190. Until the shift is completed, the shift control unit 20 continues to monitor both the engine speed Nt and the output shaft speed No.

In step S190, the shift control unit 20 instructs the drive unit 30 to maintain the current duty ratio De for a second predetermined period of time "d", and after expiration of this second predetermined period of time, instructs the drive unit 30 to drop the duty ratio to zero.

By slowly applying the friction elements to effect the first speed stage of drive, the shift shock which occurs when shifting from reverse to drive is greatly reduced. Accordingly, driver comfort is significantly increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control system for an automatic transmission in a vehicle, comprising:

a plurality of sensors each sensing a vehicle operating condition;

a transmission control unit controlling shift control solenoids and a pressure control solenoid in a hydraulic control system for said automatic transmission based on said sensed vehicle operating conditions, said shift control solenoids controlling operation of friction elements in said automatic transmission, said pressure control solenoid controlling hydraulic pressure in said automatic transmission supplied to said friction elements, said friction elements including a front clutch, a rear clutch, an end clutch and a kick-down band brake; and said transmission control unit detecting a change in driving mode from a reverse mode to a drive mode based on said sensed vehicle operating conditions, and controlling said shift control solenoids such that said automatic transmission shifts into only a first speed stage in said drive mode when said transmission control unit detects said change in said driving mode from said reverse mode to said drive mode.

2. The shift control system of claim 1, wherein said plurality of sensors include at least a position sensor sensing a position of a driving mode select lever for selecting said driving mode, and an output shaft speed sensor sensing a speed of an output shaft of said automatic transmission; and said transmission control unit determines whether said automatic transmission is in said reverse mode based on output from said position sensor, determines if a speed of said output shaft is within a predetermined range based on output from said output shaft speed sensor when said transmission control unit determines said automatic transmission is in said reverse mode, determines whether to shift said automatic transmission from said reverse mode to said drive mode based on output from said position sensor when said transmission control unit determines said output shaft speed is within a predetermined range, and controls said automatic transmission to shift into said first speed stage in said drive mode when said transmission control unit determines to shift said automatic transmission from said reverse mode to said drive mode.

3. The shift control system of claim 1, wherein said transmission control unit generates a duty ratio of said pressure control solenoid such that said hydraulic pressure in said automatic transmission increases over time.

4. The shift control system of claim 1, wherein said transmission control unit initially generates a predetermined duty ratio as said duty ratio of said pressure control solenoid, detects a start of said automatic transmission shifting into said first speed stage of said drive mode based on output from said plurality of sensors, and increases said duty ratio by a predetermined amount so that said hydraulic pressure in said automatic transmission decreases when said transmission control unit detects said start of said automatic transmission shifting into said first speed stage of said drive mode.

5. The shift control system of claim 4, wherein said transmission control unit reduces said duty ratio over time after increasing said duty ratio by said predetermined amount so that said hydraulic pressure in said automatic transmission increases over time.

6. The shift control system of claim 4, wherein said plurality of sensors include an engine speed sensor for detecting a speed of an engine connected to said automatic transmission; and said transmission control unit detects a start of said automatic transmission shifting into said first speed stage of said drive mode when said detected engine speed output by said engine speed sensor decreases.

7. The shift control system of claim 4, wherein said transmission control unit detects an end of said shift into said first speed stage of said drive mode based on said sensed vehicle operating conditions, maintains said duty ratio at a current value for a predetermined period of time after said transmission control unit detects said end of said shift into said first speed stage of said drive mode, and changes said duty ratio to zero after said predetermined period of time has expired.

8. The shift control system of claim 7, wherein said plurality of sensors include an engine speed sensor detecting a speed of an engine connected to said automatic transmission, and an output shaft speed sensor detecting a speed of an output shaft of said automatic transmission; and said transmission control unit detects said end of said shift into said first speed stage of said drive mode when said detected engine speed equals said detected output shaft speed.

9. A shift control method for an automatic transmission in a vehicle, comprising:

sensing a plurality of vehicle operating conditions;

first detecting a change in driving mode from a reverse mode to a drive mode based on said sensed vehicle operating conditions; and first controlling shift solenoids and a pressure control solenoid in a hydraulic control system for said automatic transmission based on said sensed vehicle operating conditions, said shift control solenoids controlling operation of friction elements including a front clutch, a rear clutch, an end clutch and a kick-down band brake in said automatic transmission, said pressure control solenoid controlling hydraulic pressure in said automatic transmission supplied to said friction elements, said first controlling step controlling said shift control solenoids such that automatic transmission shifts into only a first speed stage in said drive mode when said first detecting step detects said change in said driving mode from said reverse mode to said drive mode.

10. The shift control method of claim 9, wherein said sensing step senses at least a position of a driving mode select lever for selecting said driving mode and a speed of an output shaft of said automatic transmission; and said first controlling step includes the sub-steps of, first determining whether said automatic transmission is in said reverse mode based on said sensed position, second determining if said sensed output shaft speed is within a predetermined range when said first determining step determines said automatic transmission is in said reverse mode, third determining whether to shift said automatic transmission from said reverse mode to said drive mode based on said sensed position when said second determining step determines said output shaft speed is within a predetermined range, and second controlling said shift control solenoids to shift said automatic transmission into said first speed stage in said drive mode when said third determining step determines to shift said automatic transmission from said reverse mode to said drive mode.

11. The shift control method of claim 9, wherein said controlling step generates a duty ratio of said pressure control solenoid such that said hydraulic pressure in said automatic transmission increases over time.

12. The shift control method of claim 9, wherein said first controlling step includes the sub-steps of, initially generating a predetermined duty ratio as said duty ratio of said pressure control solenoid;

second detecting a start of said automatic transmission shifting into said first speed stage of said drive mode based on said sensed vehicle driving conditions; and increasing said duty ratio by a predetermined amount so that said hydraulic pressure in said automatic transmission decreases when said detecting step detects said start of said automatic transmission shifting into said first speed stage of said drive mode.

13. The shift control method of claim 12, wherein said first controlling step further comprises the substeps of, reducing said duty ratio over time after increasing said duty ratio by said predetermined amount so that said hydraulic pressure in said automatic transmission increases over time.

14. The shift control method of claim 12, wherein said sensing step senses a speed of an engine connected to said automatic transmission; and said second detecting step detects a start of said automatic transmission shifting into said first speed stage of said drive mode when said sensed engine speed decreases.

15. The shift control method of claim 12, wherein said first controlling step further comprises the sub-steps of, third detecting an end of said shift into said first speed stage of said drive mode based on said sensed vehicle operating conditions;

maintaining said duty ratio at a current value for a predetermined period of time after said detecting step detects said end of said shift into said first speed stage of said drive mode; and changing said duty ratio to zero after said predetermined period of time has expired.

16. The shift control method of claim 15, wherein said sensing step senses a speed of an engine connected to said automatic transmission and senses a speed of an output shaft of said automatic transmission; and said third detecting step detects said end of said shift into said first speed stage of said drive mode when said sensed engine speed equals said sensed output shaft speed.

* * * * *